United States Patent [19]

Burgess

[11] Patent Number: 5,718,257
[45] Date of Patent: Feb. 17, 1998

[54] AXIAL-MOUNTED HIGH FLOW VALVE

[75] Inventor: Robert K. Burgess, Sheridan, Wyo.

[73] Assignee: Big Horn Valve, Inc., Sheridan, Wyo.

[21] Appl. No.: 637,203

[22] Filed: Apr. 24, 1996

[51] Int. Cl.$^6$ .................... F16K 1/22; F16K 11/14; F16K 24/02
[52] U.S. Cl. .................. 137/218; 137/360; 137/596.2; 251/305
[58] Field of Search .................. 137/218, 302, 137/305, 360, 596.2; 251/305

[56] References Cited

U.S. PATENT DOCUMENTS

| | | | |
|---|---|---|---|
| 194,973 | 9/1877 | Phillips | 137/302 X |
| 222,680 | 12/1879 | Dows . | |
| 286,508 | 10/1883 | Vadersen et al. | 137/302 |
| 332,731 | 12/1885 | Miller . | |
| 958,079 | 5/1910 | Bennett | 137/302 |
| 960,675 | 6/1910 | Murphy . | |
| 1,317,789 | 10/1919 | Hoar | 137/360 |
| 1,334,870 | 3/1920 | Lowry . | |
| 1,443,231 | 1/1923 | McCauley . | |
| 1,556,979 | 10/1925 | Uschman . | |
| 1,777,434 | 10/1930 | Herzbrun . | |
| 2,198,455 | 4/1940 | Mueller et al. | 251/150 |
| 2,507,467 | 5/1950 | Fredrickson et al. | 137/69 |
| 2,508,958 | 5/1950 | Manville | 15/129 |
| 2,750,962 | 6/1956 | Kreitchman et al. | 137/625.48 |
| 2,767,019 | 10/1956 | Manville | 299/58 |
| 2,822,818 | 2/1958 | Breznick | 137/454.6 |
| 2,894,695 | 7/1959 | Beltcher et al. | 239/443 |
| 2,949,240 | 8/1960 | Koolnis | 239/200 |
| 2,977,988 | 4/1961 | Drobilits et al. | 137/625.17 |
| 3,073,566 | 1/1963 | Bredtschneider | 251/362 |
| 3,096,786 | 7/1963 | Rost | 137/596.2 |
| 3,145,010 | 8/1964 | Karr, Jr. | 251/210 |

(List continued on next page.)

OTHER PUBLICATIONS

Jay R. Smith Mfg. Co. Quarterhorse valve brochure (appears related to cited Buehler Pat. No. 4844116) (Undated).
Woodford Automatic Draining Freezeless Wall Hydrants, form 84,108, Jun. 1991.
Tech Note, Automatic Draining Freezeless Wall Faucets with Vacuum Breaker, Nov., 1989.
Tech Note, Automatic Draining Freezeless Wall Hydrants, Aug., 1986.
Febco® Cross Connection Control Handbook, pp. 1–12 (1977).
Febco® Backflow Prevention Assemblies, "Backflow Prevention Assemblies: Why They Are Needed" (Dec. 1991).
Watts Regulator advertisement of TWS Hydrant (Undated).
McMaster Carr Co. 1989 cata. advertisement for Remote Mechanical Valve Actuator.
Apollo® advertisement for ball valve with center drain (Undated).
*Introduction to Fluid Mechanics*, Fox & McDonald, publ. 1973, Laminar and Turbulent Flows, pp. 43–44, 312–323.

*Primary Examiner*—Gerald A. Michalsky
*Attorney, Agent, or Firm*—Brit Nelson

[57] ABSTRACT

The invention includes an axial-mounted high flow rate valve by fixedly mounting a rotatable valve sealing element so that it pivots on an axis which is substantially parallel to a central axis of the pipe or conduit to which the valve is connected. The rotatable valve sealing element can be not only circular, but non-circular as well, having an extended length along the pivot axis for even greater flow rates and may be particularly suited for installations in sprinkler systems which require greater flow than a normal valve of the same diameter and may even be used as a combination valve for hydrant and sprinkler system use, such as in residential applications. The present invention also may include a purge port to purge residual fluid remaining in the valve, downstream of the valve sealing element, to assist in preventing freezing of the valve and it may include an air port to allow air to enter the valve to alleviate a possible vacuum created by the purging and to enable more effective purging.

37 Claims, 7 Drawing Sheets

U.S. PATENT DOCUMENTS

| | | | |
|---|---|---|---|
| 3,176,720 | 4/1965 | Donahue | 137/625.44 |
| 3,273,851 | 9/1966 | Rosch, Jr. et al. | 251/124 |
| 3,424,189 | 1/1969 | Woodford | 137/218 |
| 3,506,030 | 4/1970 | Vesco | 137/595 |
| 3,521,667 | 7/1970 | Johnson | 137/454.6 |
| 3,533,554 | 10/1970 | Mongerson | 239/27 |
| 3,736,959 | 6/1973 | Parkison | 137/625.17 |
| 3,749,355 | 7/1973 | Paul, Jr. | 251/124 |
| 3,779,508 | 12/1973 | Paul, Jr. | 251/124 |
| 3,848,806 | 11/1974 | Samuelsen et al. | 239/265.11 |
| 3,954,250 | 5/1976 | Grace | 251/144 |
| 4,022,243 | 5/1977 | Edwards | 137/360 |
| 4,066,090 | 1/1978 | Nakajima et al. | 137/62 |
| 4,117,856 | 10/1978 | Carlson | 137/62 |
| 4,178,956 | 12/1979 | Fillman | 137/360 |
| 4,200,124 | 4/1980 | Stratynski et al. | 137/885 |
| 4,261,332 | 4/1981 | Stewart | 126/420 |
| 4,301,972 | 11/1981 | Rudelick | 239/443 |
| 4,316,481 | 2/1982 | Fillman | 137/302 |
| 4,475,570 | 10/1984 | Pike et al. | 137/218 |
| 4,483,361 | 11/1984 | Jungbert, Sr. | 137/301 |
| 4,520,836 | 6/1985 | Hutter, III | 137/59 |
| 4,532,954 | 8/1985 | Fillman | 137/302 |
| 4,809,732 | 3/1989 | Buehler | 137/209 |
| 4,844,116 | 7/1989 | Buehler et al. | 137/360 |
| 5,004,157 | 4/1991 | Martell | 239/205 |
| 5,355,905 | 10/1994 | Burgess et al. | 137/1 |
| 5,413,134 | 5/1995 | Burgess et al. | 137/1 |
| 5,573,186 | 11/1996 | Loschelder | 239/436 |
| 5,622,203 | 4/1997 | Givier et al. | 137/337 |

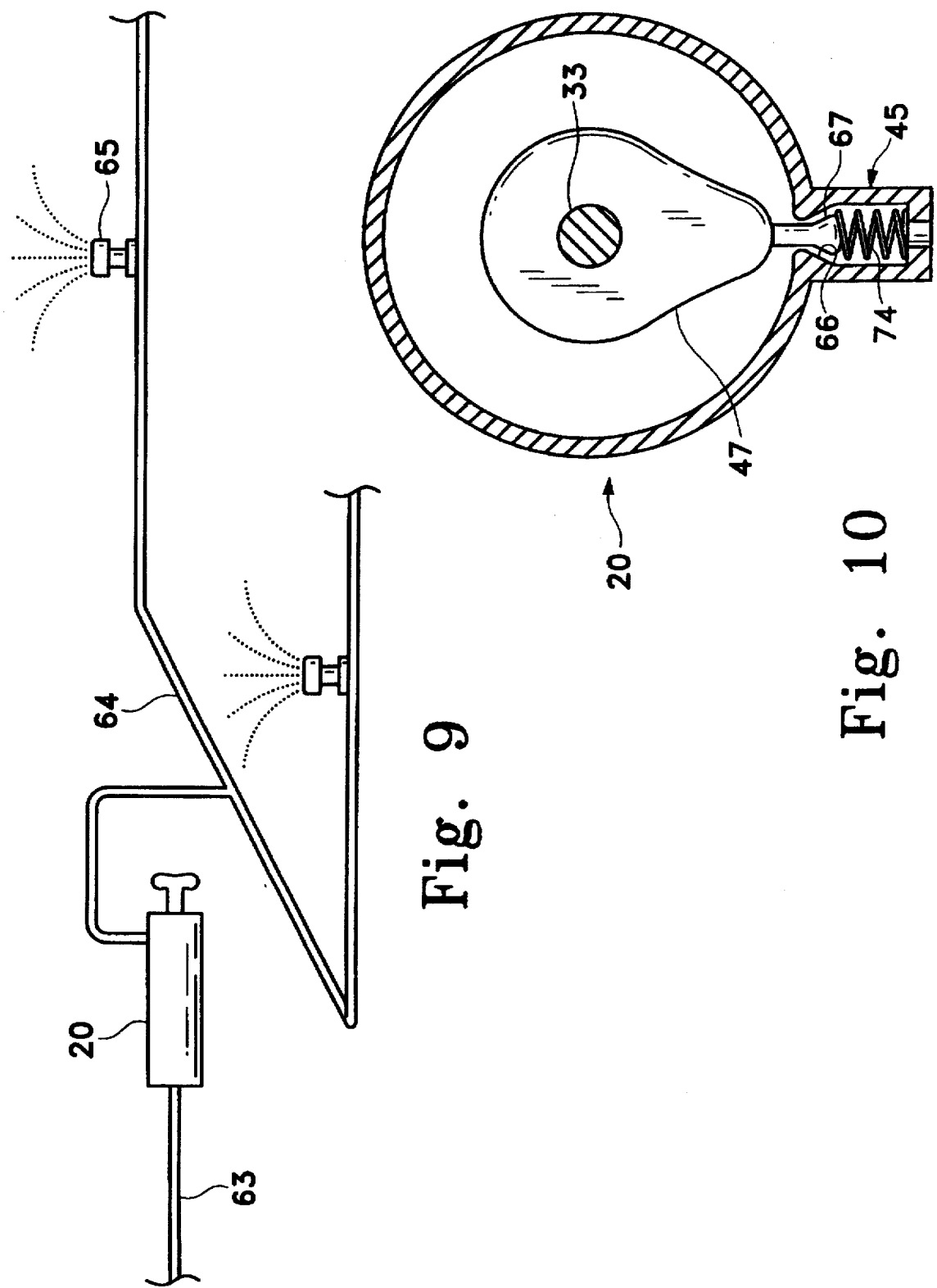

5,718,257

AXIAL-MOUNTED HIGH FLOW VALVE

FIELD OF INVENTION

The present invention relates to an improved flow rate valve system and valve to be used primarily where a freeze resistant installation is preferred. In particular, the valve system and valve has applicability to sprinkler systems, both overhead and underground. The invention relates to both apparatus and methods of manufacture and use. The invention also includes purge port apparatus and methods for purging fluid in the valve.

BACKGROUND OF THE INVENTION

Valves have been used for many centuries in a variety of applications. As the technology has progressed, more sophisticated uses have been found for valves. For instance, various improvements have been made in methods of actuation of the valve. Some of these methods include motor driven actuation, solenoid actuation and more recently, computer controlled actuation, and so forth. However, the essential internal design of valves has stayed relatively constant. One type of valve used is a gate valve. A gate valve typically contains a circular disk, known as a gate, mounted transverse to a conduit or pipe which engages a seat to block or restrict fluid flow. A gate valve is generally known to those in the art as being poor for controlling flow other than in a fully-open or fully-closed position. The interface between the gate and its seat generally erodes and is prone to maintenance.

The other typical valve is known as a globe valve. Those in the art know that it is good for throttling flows at other than fully-open or fully-closed positions. However, flow rates tend to be less than those of a fully-opened gate valve, the fluid flow paths tend to wear, and the globe valve, because of its inherent construction, tends to be bulky.

A third valve is known as a butterfly valve. A butterfly valve has an internal seat that is oriented transverse to the conduit. An external valve stem rotates typically a circular disk transverse to the conduit to engage the seat to block fluid flow. A butterfly valve generally has high flow rates and low maintenance. However, it retains the typical construction of a transverse-mounted valve and a transverse valve stem with respect to a centerline of a conduit. While the valve stem may be remotely actuated by motors and other devices known to those in the art, it is not suitable for sealed installations where it might be desirable to completely encase the valve, remote actuator, and seat in a conduit for efficient installation. Nor is it suitable for installing in a wall structure where access to the actuator is restricted because of the transverse orientation.

A further level of sophistication has been approached by those in the art regarding freeze prevention of the valve. In addressing freeze prevention or reduction, efforts concentrated on a remote location of a plug of the globe valve away from ambient conditions that would lead to freezing. By remotely locating the plug, the flow of the liquid, typically water, could be stopped a distance in a pipe or a conduit away from the freezing ambient conditions. Those in the art typically concentrated on a globe valve type construction because of the inherent difficulty of actuating a gate valve from within the conduit. A typical example is seen in FIG. 7 of U.S. Pat. No. 4,532,954 to Fillman. In that construction, the nose portion engages a valve seat to seal any flow at a remote location from adverse ambient conditions. As is shown in that figure, the nose must engage a valve seat through the aperture that restricts the flow of the water. This remote location results in a beneficial blocking of the water away from the freezing ambient conditions. However, it causes other problems. The wear surfaces are prone to water erosion and deposits from water impurities. Also, in order to obtain a proper seal, the mechanical advantage of the screw of the valve stem would, after much use, crush the tip of the nose portion. Once the nose was crushed or deformed, it required even harder tightening of the nose which eventually lead to leaking (the famous "drip drip"). But most importantly, the inherent design of the nose portion, engaging an aperture, caused a significant pressure drop, as those with ordinary skill in the art would immediately recognize. This significant pressure drop reduces flow rates. Additionally, the use of the nose section was a modification of the globe valve which required many turns to suitably seal the flow. Likewise, the valve control rod of the Fillman reference moved in the typical longitudinal direction. It was not fixed with respect to the conduit or pipe in which it was assembled. Therefore, increased wear and increased maintenance resulted from not only the rotational movement, but the longitudinal movement as it engaged the nose portion to the valve seat.

While an increase in size of the typical valve could result in the necessary flow rates, typically, this is not a viable option. First, larger valves incur larger costs. Secondly, larger valves that are not of the same diameter of the other piping systems tend to complicate the installation and not be as compatible as a similar diameter valve of the piping system.

Prior attempts to remotely seal the water flow or other liquids lead to high pressure drops, low flow rates, and maintenance. The flow rate was especially important in considering sprinkling systems. Both residential and commercial sprinkler systems require a higher flow rate than the typical gate valve or globe valve delivers for a given typical size. Typically, either ¾ inch or 1 inch diameter piping system is available, particularly in residential systems. With the nose portion engaging the valve seat through an aperture, the flow rates available to a sprinkler system were minimal. Thus, an installation was not able to use the typical valving of a typical freeze resistant hydrant—instead, it required a direct connection to other piping with sophisticated valving controls. The sophisticated valving, as those with knowledge of sprinkler system installations would recognize, requires expensive controls, maintenance, purging during off-season uses and other issues. Complicating the sprinkler systems is a typical requirement of local and national code restrictions requiring at least two outside faucets in residential installations such as one outside faucet in the rear of the dwelling and one toward the front. To add the sprinkling system required further plumbing with the attendant cost. If a system were available that would allow a high flow rate water hydrant that could be converted to a combination sprinkler system and water hydrant, it would have an advantage in the market. It would be advantageous to the dwelling owner in a reduction of cost, and it would be advantageous to the builder or installer to simply meet the code requirements of installing outside faucets and yet allow conversion to sprinkler systems at minimal cost.

Thus, as systems have become more sophisticated, a need exists for a valve that can be remotely actuated through the internal structure of a valve away from adverse ambient conditions, and yet be inexpensive, easily installed, of the same or similar diameter to existing piping systems, and still maintain high flow rates and low pressure drops.

Thus, there has been a long felt, but unsatisfied, need for the invention that would meet and solve the problems discussed above. While the implementing elements have all been available, the direction of the inventions of other persons have been away from the present invention. The efforts have primarily concentrated on longitudinally moving backward and forward a nose or other sealing element against a valve seat, typically including an aperture. This has resulted in the above discussed problems, such as poor flow rates. Those in the art appreciated that a problem existed and attempted to solve the problem with technology as shown in U.S. Pat. No. 4,532,954. Alternatively, those in the art simply accepted the extra expense of extra installations, complicated valving, and other requirements necessary for a sprinkler system. Furthermore, those persons simply accepted lower flow rates or increased costs by substituting larger valving. While those in the art made substantial attempts to fill the need, they seemed restricted by the idea that a nose must forwardly engage longitudinally a valve seat and then disengage by moving away from the valve seat longitudinally. This general mindset taught away from the technical direction that the present invention addresses. It might be unexpected that a valve could have significantly higher flow rates and yet remotely control or block the fluid flow with the same or similar size conduit or pipe found in typical installations and still offer an economical solution. Until the present invention, it appears that those instilled in the art had not contemplated the solution offered by the present invention.

SUMMARY OF THE INVENTION

The present invention discloses an improved flow rate, lower pressure drop, remotely actuated valve. Typically, its primary use is envisioned on residential and commercial installations where it would be desirable to economically reduce the possibility of freezing of the valve. Such applications could also involve sprinkler systems, both underground and above ground. Rather than supplying a system which affords only an incremental increase in performance and design over prior art, the present invention utilizes a technique, which was not previously considered, to achieve leaps in performance compared to prior art. The valve of the present invention satisfies one of the criteria by being inexpensive to manufacture and yet still offer high flow rates, good maintenance, and low pressure drop.

In general, the invention provides devices and methods utilizing a specially designed valve that has a rotatable sealing element longitudinally fixed in position in a conduit which engages a seating element likewise longitudinally fixed in position in the conduit. The position can be fixed at any suitable location in the conduit, subject to engineering constraints. The position can be located a sufficient length or distance from adverse ambient conditions, such as freezing conditions, to enable a sealing of flow away from the ambient conditions. The invention is compact and may be the same or similar in size to typical residential piping and integrates easily in such systems. Additionally, its improved flow rates may allow use equally well for sprinkler systems as well as typical hydrants.

The invention also includes several embodiments of a purge port in a valve. Under freezing conditions, it is often desirable to purge, at least partially, the remaining water or other fluid from the area of the conduit exposed to the adverse ambient conditions. The valve acts to close-off or restrict the flow while opening a purge port to drain residual fluid remaining in the valve. This invention includes a purge port in the valve and related hardware and methods for purging the valve to make a more complete system.

Importantly, the invention breaks from several time-honored traditions in designing valves, and especially freeze resistant valves and those suitable for sprinkler systems. While drawing from some of the important conditions demanded of these devices for providing effective water flow and sufficient water pressure, the invention expands upon these conditions in an effort to provide a simple and easy valve system with greatly improved flow rates compared to those valves of similar diameter and purpose. By recognizing and utilizing the advantages of a wholly different layout and design of a valve, this valve achieves its goals.

It is therefore a goal of the present invention to provide a design which permits increased flow rates for freeze preventing valves and sprinkler systems which are connected to conduits or pipes. Test results using the globe valve compared to the present invention suggest that the globe valve may have up to approximately twenty times the pressure loss for a given flow rate than the present invention. Similarly, the present invention appears to have about five times less friction loss than designs such as the invention shown in U.S. Pat. No. 4,532,954. One object of the invention is to orient a rotatable sealing element and a seating element for restricting the flow of a fluid in an axial direction with respect to the central axis of a conduit. The rotatable sealing element may be rotated about a pivot axis substantially parallel to the central axis of the conduit, instead of the previously time-honored transverse orientation of prior art. Another object of the invention is to relatively fix the position of the rotatable sealing element in a longitudinal position relative to the conduit so that the primary movement is simply rotation, unlike other devices. Another object of the invention is to align the valve stem in an axial direction with respect to the central axis of the conduit to actuate the rotatable sealing element from a remote location so that minimal cross-sectional space may be taken and reduced costs realized. While a typical geometric shape of the rotatable sealing element might be substantially circular, another object of the invention is to allow non-circular rotatable sealing element designs. The flow rate can be further enhanced by longitudinally extending the length of the rotatable sealing element, while maintaining the appropriate dimensions for the size of conduit. This feature is possible because of the unique axial orientation of the rotatable sealing element. Another object of the invention is to allow at least partial purging of the fluid remaining in the valve downstream of the rotatable sealing element through a purge port. Likewise, upon purging, another object is to allow the entrance of air to relieve any vacuum created by the purging to enable a more complete purging.

Another goal of the present invention is to provide a convertible valve, suitable for hydrant use as well as the greater flow requirements of a sprinkler system. One object of the invention is to allow sufficient flow rates such that the typical complicated and additional valving, water taps into a main supply line, and the associated costs may be avoided by simply installing this present invention in place of a typical wall hydrant or faucet. Another object is to allow plumbers and other contractors to comply with city ordinances and plumbing codes. Typically, two wall hydrants are required in residential construction. Then the contractors may also have to install a third specialized system for sprinklers. The present invention allows simply the normal installation of the two hydrants, because the present invention has higher flow rates for the typical size of valve used in construction. The higher flow rates enable a convertible use or even dual use of the valve.

Another goal of the present invention is to provide relatively fixed rotation stops and yet insure sufficient sealing of the flow. One object is to provide longer service life. By allowing relatively fixed stops for the sealing surfaces, the wear created by over compression of the sealing surfaces is reduced. Another object related to this goal is to provide for quick opening of the rotatable sealing element. This quick and controlled opening can be accomplished in approximately one-quarter turn of the valve stem, unlike other freeze resistant valves.

Another goal of the present invention is to create a better sprinkler system by using the designs and methods of the present invention. By using these designs and methods, greater flow can be realized. Thus, a combination hydrant and sprinkler system valve can be made using this invention. Also, this could result in greater spacing between sprinkler elements that spray or reduced size of conduit or other advantages.

Another goal of the present invention is to provide for purging of the remaining fluid downstream of the rotatable sealing element. One object is to at least partially purge the remaining fluid to prevent that fluid from freezing or otherwise harming the valve or conduit or other elements. Another object is to accomplish the purging concurrently with the rotation of the rotatable sealing element. To accomplish this object, a purge port actuation element can be responsive to the rotation of the valve stem and actuate the purge port. Another object regarding the purge port is to restrict flow of the fluid through the purge port when the valve is open and in use. This can be accomplished by the use of a unidirectional flow element or a rotatable purge port alignment element.

Naturally, further objects of the invention are disclosed throughout other areas of the specification and claims.

BRIEF DESCRIPTION OF THE DRAWINGS

FIG. 9 shows a sprinkler system including the described valve and various sprinkler system elements.

FIG. 10 shows an enlarged view of a frontal cross-section of a purge port and purge port actuation element.

DETAILED DESCRIPTION OF THE PREFERRED EMBODIMENTS

Figure 1:
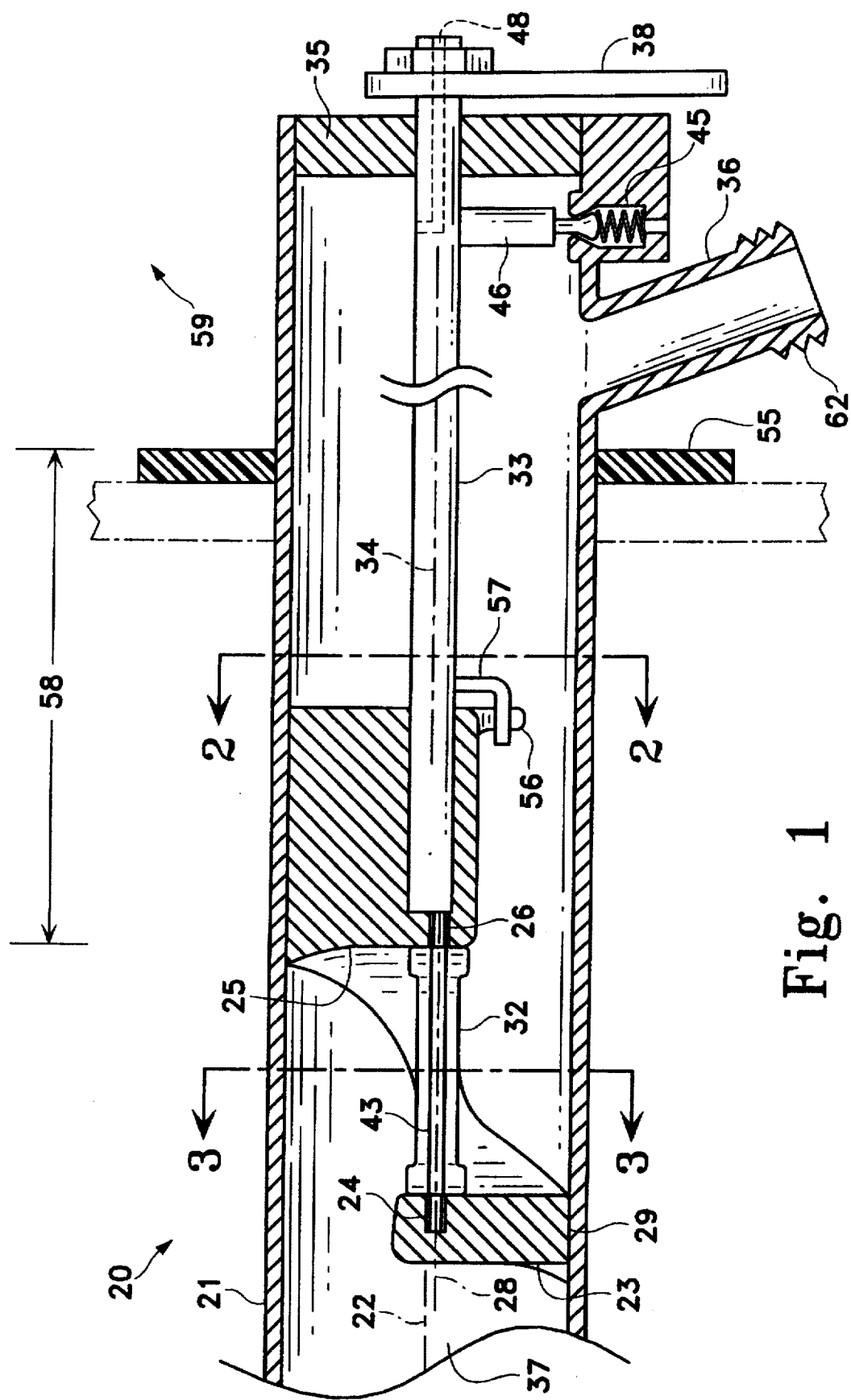
FIG. 1 is a cross-section of the present invention from a side perspective.

As can be seen from the drawings, the basic concepts of the present invention may be embodied in many different ways. The invention, however, is designed to primarily take advantage of a rotatable sealing element which is aligned substantially parallel to the central axis of the conduit as will be explained in more detail as the figures are described. Elements, functions, and procedures which distinguish the present invention will be noted where appropriate.

FIG. 1 shows a cross sectional view of a primary embodiment of the present invention. Valve (20) comprises several distinct elements. Beginning with the conduit (21), it has a central axis (22) which generally follows the center of the conduit. This conduit would typically be a pipe or other round shape. However, the unique characteristics of the present invention allow for a rectangular or square or other shaped conduit. A lower valve element (23) supports one end of the rotatable sealing element (32) at a first pivot point (24). On the other end of the rotatable sealing element is an upper valve element (25) which supports the other end of the rotatable sealing element (32) at a second pivot point (26). Between the first pivot point (24) and the second pivot point (26), a line could be drawn that could establish a pivot axis (28) about which the rotatable sealing element (32) would rotate. This pivot axis (28) is aligned substantially parallel to the central axis (22). "Substantially parallel," as used in this specification, includes any alignment that would allow the rotatable sealing element (32) to be pivoted from within a single dimension of the conduit without the necessity of protrusions extending outside the conduit (21). As but one example, referring to FIG. 5, the angle could be oriented up to approximately 30 degrees either way of the central axis and still comply with the intent and operation of the present invention.

The lower valve element (23) and upper valve element (25) may be fixedly positioned longitudinally with respect to the conduit (21). "Longitudinally positioned" or "fixedly positioned" means the elements are fixed in position such as they do not substantially move longitudinally back and forth along the central axis (22). This aspect significantly departs from the prior inventions such as found in U.S. Pat. Nos. 4,178,956 and 4,532,954 where the sealing element, such as a nose potion, moves longitudinally back and forth along the central axis. Until the present invention, other inventions assumed such substantial longitudinal movement was required. However, this invention, because its internal sealing element rotates in an axial direction, does not need to substantially move longitudinally. Because the rotatable sealing element (32) may be substantially fixed longitudinally, the handle or other actuation means which rotates the valve stem (33) may also be fixedly positioned longitudinally. This can be advantageous in various close tolerance situations. The rotatable sealing element (32) may be substantially fixed in position at a certain prescribed distance along the central axis (22) in the conduit (21). The upper valve element (25) and the lower valve element (23) may be connected about their periphery (29) to the conduit (21). This may be accomplished by, for instance, soldering in place, threadably engaging, or adhesively attaching.

While the use of the term lower valve element (23) and upper valve element (25) tend to comport with the general intent of the invention in a lower and upper orientation in a vertically displaced position, they are not intended to be restricted to that orientation. For instance, both elements could be on the same side of the conduit or even extend across the conduit, if flow was diverted through ports in the valve elements. Both elements could be longitudinally displaced (meaning at different locations along the flow path) from each other, but not vertically displaced. Thus, as long as the rotatable sealing element (32) seals in an axial direction along the pivot axis (28), the intent and the concepts of the invention are satisfied. Likewise, while the lower valve element (30) and upper valve element (31) have been described as "lower" and "upper", it is equally applicable to call them "first" and "second" valve elements. The intent of the term is to define two elements wherein one element is the first in a flow path to support the rotatable sealing element (32) followed by a second with respect to its flow path.

Figure 4:
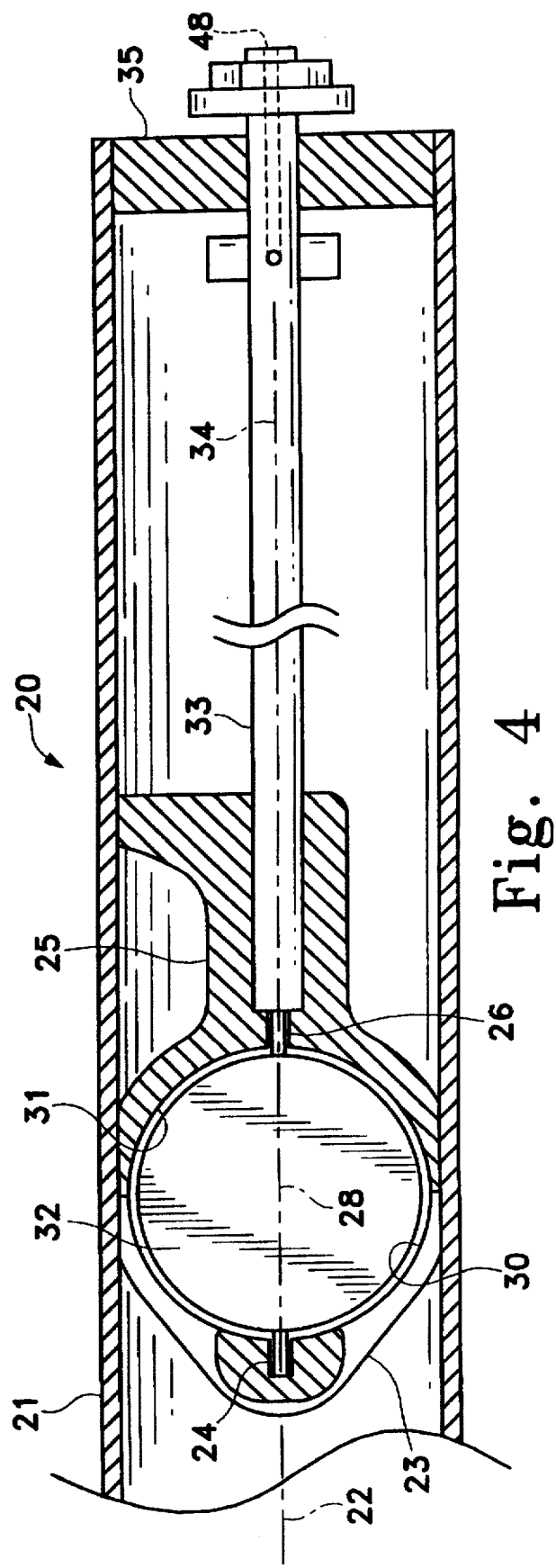
FIG. 4 is a cross-sectional top view of the present invention.
Figure 5:
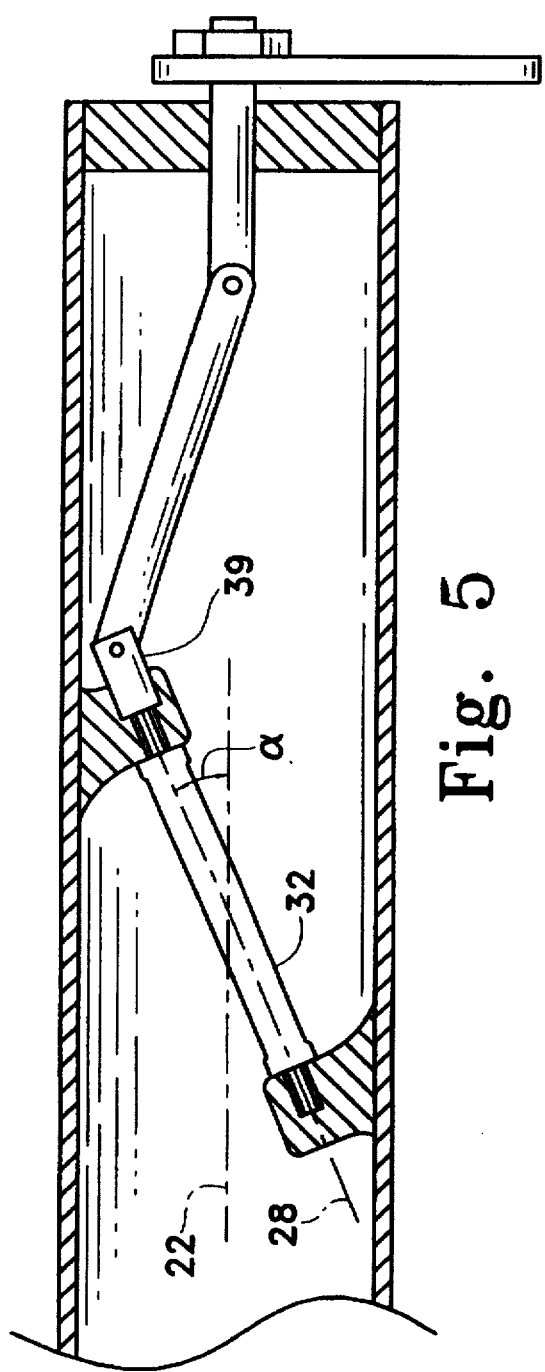
FIG. 5 is a cross-section of the present invention shown from a side perspective to assist in defining the term "substantially parallel."

The lower valve element (23) may be connected to or integral with a lower valve seat (30), better shown in FIG. 4. Likewise, the upper valve element (25) may be connected to or integral with an upper valve seat (31). The rotatable sealing element (32) may engage the valve seats in a sealing manner. Connected to the rotatable sealing element generally on one end is an axial valve stem (33) having a stem axis (34). Generally, the stem axis (34) would be substantially parallel to the central axis (22) of the conduit (21). As shown in FIG. 5, a flexible member (39) could be attached between the valve stem axis (33) and the rotatable sealing element (32) and the valve stem still be substantially parallel, as defined herein.

Toward one end of the valve (20) is a valve stem sealing element (35). This element seals the valve stem (33) so that any fluid in the conduit (21) does not leak out to the external valve surfaces. Connected to the conduit (21) is a first outlet (36). This first outlet (36) may be comprise a hose bibb thread (62) for connection to general devices such as hoses.

When the rotatable sealing element (32) is in a position that seals any flow coming from the inlet (37), there is a residual amount of fluid left downstream of the rotatable sealing element (32). It may be desirable to drain or purge, at least partially, any remaining fluid downstream of the rotatable sealing element (32). A purge port (45) enables this purging. The purge port (45) may be actuated by a purge port actuation element (46). This purge port actuation element (46) may be any design which actuates the purge port to drain fluid, and could include a rotatable eccentric, such as a cam, which can be rotated and may be attached to the axial valve stem (33). Alternatively, the valve stem (33) may, upon rotation, actuate other devices besides a rotatable eccentric such as a rocker, various linkages, any sort of magnetic engagement element responsively actuated by the relative proximity of magnets, or even an electrical solenoid—as those with ordinary skill in the art would understand. The key point is the purge port is actuated by some response to the rotation of the axial valve stem (33).

For installation purposes, the valve (20) may be installed through some wall and attached to the outside of the wall by a securing element (55). Where desired, the axial valve stem (33) may be extended such that the rotatable sealing element (32) is located a certain distance or length (58) away from any adverse ambient conditions (59) existing on the outside of the wall. This length (58) can be determined experientially and is generally that length that would insure the rotatable sealing element (32) is a certain distance away from the adverse ambient conditions, such as freezing weather, and so forth.

Figure 2:
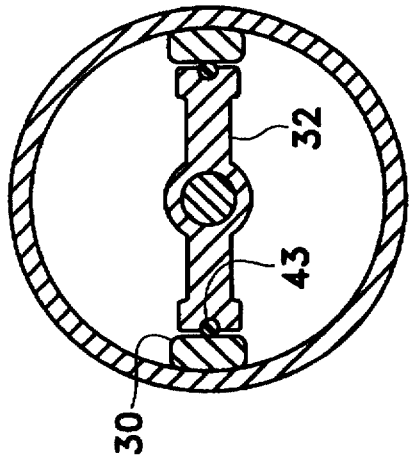
FIG. 2 is an end view at section 2 of FIG. 1.

One of the advantages of the present invention is that the rotatable sealing element (32) may be stopped in a fully-open or a fully-closed position with a plurality of positive valve stem stops (56). This number could be two stops, as shown in FIG. 2. These positive valve stem stops (56) are positioned at certain predetermined rotated positions with respect to each other. A stop element (57) could be used to engage the positive valve stem stops (56) and could be connected to the valve stem (33). Likewise, the positive valve stem stops could be located outside the valve (20) and use an external stop element.

Having positive valve stem stops is an advantage over other actuated sealing elements because the rotatable sealing element (32) may be rotated within certain prescribed movements and tends to seal at the same location each time. Thus, extra exertion of pressure has little or no effect upon the rotatable sealing element (32) and the sealing surfaces remain generally intact. The predetermined rotated positions can be spaced at an angle $\beta$ of, for example, approximately one-quarter turn apart, as shown in FIG. 2. Given the orientation and design of the valve (20) and the rotatable sealing element (32), an approximately one-quarter turn would rotate the rotatable sealing element (32) between a fully-closed and fully-open position.

A cross-sectional view through FIG. 1 at section 2 is shown in FIG. 2. FIG. 2 shows the rotatable sealing element (32) in a partially rotated position about the pivot axis (28) using the axial valve stem (33). Also shown in FIG. 2, as in FIG. 1, is a flexible sealing element (43) which engages the lower valve seat (30) and upper valve seat (31). This flexible sealing element may have a cross-section similar to an O-ring, known to those in the art.

Figure 3:
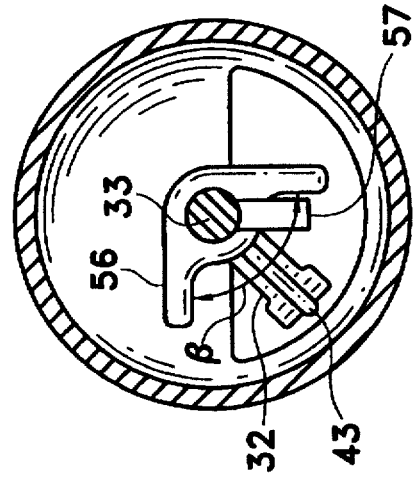
FIG. 3 is an end view at section 3 of FIG. 1.

FIG. 3 shows a cross-sectional view through FIG. 1 at section 3. FIG. 3 shows the rotatable sealing element (32) with the flexible sealing element (43) engaging the lower valve seat (30). While the lower valve element (23) has been described as a separate element from the upper valve element (25), nothing prevents these two elements from being integral, i.e., one piece, so as to surround the rotatable sealing element (32) in a unitary fashion. Likewise, lower valve element (23) could remain separate from upper valve element (25) and yet have a valve seat comprising a lower valve seat (30) and upper valve seat (31) as an integral unit.

FIG. 4 shows a cross-sectional top view of FIG. 1 of the valve (20). The lower valve element (23) and upper valve element (25) can be hydrodynamically shaped such that fluid flows with less turbulence through the valve, using shapes such as smooth transitions, curved surfaces, extensions, and so forth, as known to those in the art. As shown in this top cross-sectional view, the lower valve seat (30), which may be attached to the lower valve element (23), partially surrounds the rotatable sealing element (32). Likewise, the upper valve seat (31), which may be attached to the upper valve element (25), partially surrounds the rotatable sealing element (32) such that the valve seats together surround the whole periphery of the sealing element (32). Obviously, if one were to desire a partial sealing, then the lower and upper valve seats need not surround the entire periphery of the rotatable sealing element (32). The pivot axis (28) in FIG. 4 also may be substantially aligned with the central axis (22). Likewise, the stem axis (34) of the axial valve (33) may be substantially aligned with the central axis (22).

FIG. 5, as discussed earlier, shows that the central axis (22) and the pivot axis (28), as herein defined, can be substantially parallel and can vary from a strict coaxial parallel alignment. As in certain angles, it may be desirable to have a flexible member (39) in at least one position connecting the axial valve stem (33) to the rotatable sealing element (32). Depending on the orientation, other flexible members (39) may be required, such as the other end of the axial valve stem (33). The flexible element (39) could include items ranging from universal joints to truly flexible elements, recognized by those of ordinary skill in the art.

The valve can be fabricated from a butterfly valve assembly. The butterfly valve assembly would need substantial modification and generally comprise the first pivot point (24) and the second pivot point (26), the rotatable sealing element (32), and the lower valve element (23) and the upper valve element (25), which collectively form an integral unit when using a butterfly valve assembly. The butterfly valve assembly could then be fixedly mounted within the conduit (21) about its periphery (29) at a certain distance from the end of the conduit (21) defined by the length (58) to make the valve (20). By mounting it such that the pivot axis of the butterfly valve assembly was axially mounted substantially parallel with respect to the central axis (22) of the conduit (21), a similar result could be reached as the embodiment described in FIG. 1. Likewise, the butterfly valve assembly would generally use a rotatable axial valve stem (33) mounted in an axial orientation which is essentially parallel to the central axis (22) of the conduit (21). As long as it were oriented in an axial position with respect to the conduit, the intent and scope of the present invention would be realized.

One advantage of the present invention is that the axial rotation of the rotatable sealing element (32), the pivot points, (24) and (26), and the axial valve stem (33) may be maintained within a single dimension of a conduit. This is in direct opposition to other configurations of the gate valve, globe valve, and butterfly valve where the valve stem generally protrudes through the conduit transverse to the conduit.

Figure 6:
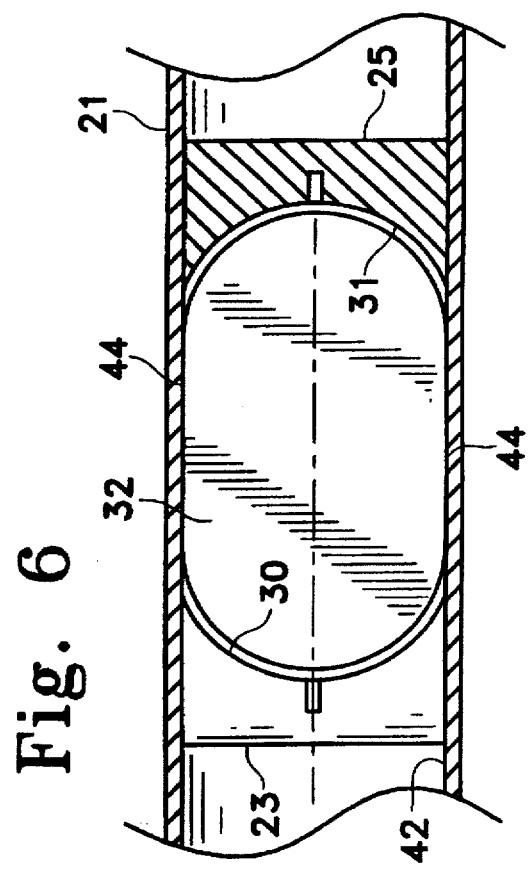
FIG. 6 shows one embodiment of a rotatable sealing element.

Referring to FIG. 6, one of the distinct characteristics of the present invention is that the rotatable sealing element (32) does not need to be circular as in other inventions, discussed briefly earlier. Because the rotatable sealing element (32) may be aligned substantially parallel with the central axis (22), the geometric shape of the rotatable sealing element may be non-circular. The rotatable sealing element (32) could be shaped to comprise two parallel line surfaces (44) with two elliptical ends which engage the lower valve seat (30) and the upper valve seat (31). Obviously, the ends could be shaped other than elliptical, i.e., square, rectangular, or other geometric shapes such as a trapezoid or parallelogram or even a triangle. The length of the rotatable sealing element (32) along the pivot axis (28) can be extended according to the needs of the application. To a certain extent, the extension of the length may also increase fluid flow. It is even possible, as shown in FIG. 6, for the rotatable sealing element to engage the inner surfaces (42) of the conduit (21). This engagement could be accomplished by the two parallel line elements (44).

Figure 7:
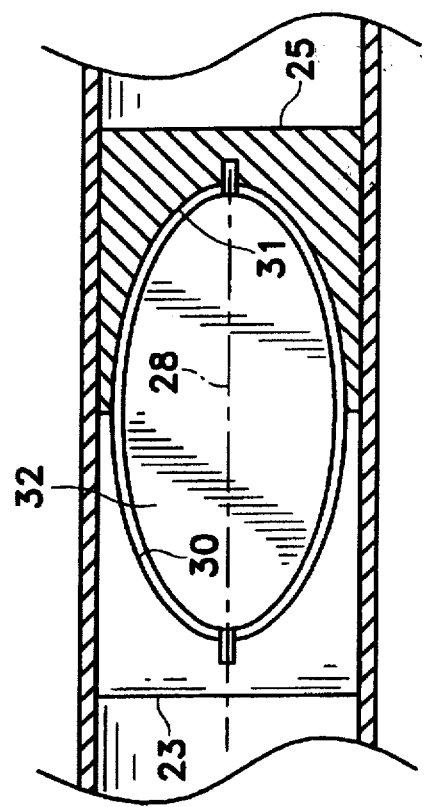
FIG. 7 shows another embodiment of a rotatable sealing element.

As shown in FIG. 7, the rotatable sealing element (32) can also generally be elliptical and can be extended any determined length along pivot axis (28). Also, shown in FIG. 7 is a variation of the lower and upper valve elements. The lower valve element (23) is shown as a separate and distinct part from upper valve element (25), while the lower valve seat (30) is integrally connected with the upper valve seat (31), as discussed above. Obviously the lower and upper valve elements and lower and upper valve seats collectively could be an integral unit.

Figure 8:
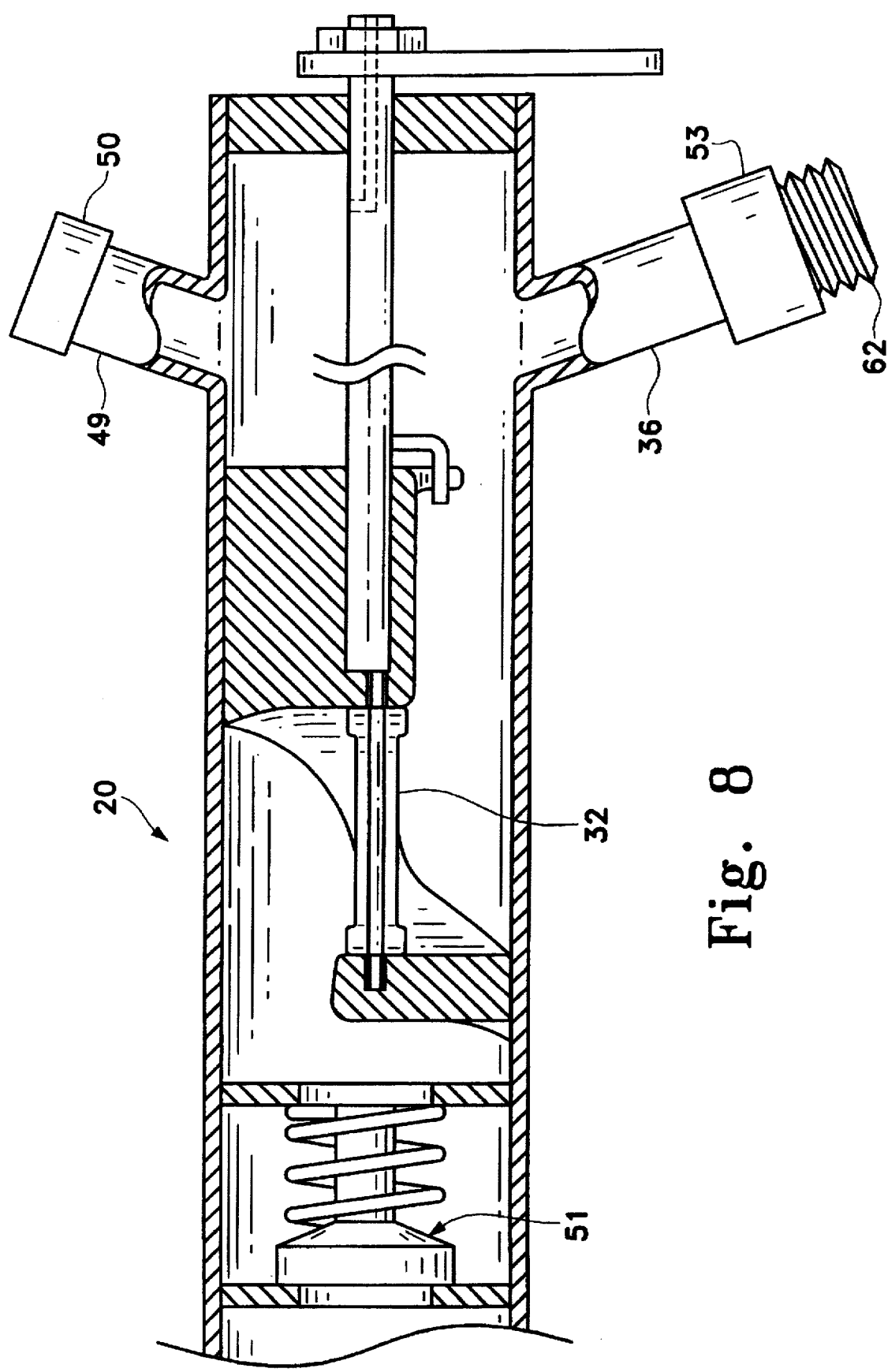
FIG. 8 shows related parts of a valve including a backflow preventer, hose bibb, and pressure vacuum breaker.

FIG. 8 shows other appurtenances of the valve (20). These include a backflow preventer (51). Generally, this backflow preventer (51) would be located upstream from the rotatable sealing element (32) as shown in FIG. 8. However, it could have other positions that would be suitable. The backflow preventer as shown in FIG. 8 may be a check valve. A variation of the check valve could be a diaphragm with flaps working in a unidirectional flow fashion. Also shown in FIG. 8 is a second outlet (49) which may be attached to a vacuum breaker (50), known to those in the art.

The vacuum breaker (50) could be an external unit attached to the valve. For instance, if the internal check valve and vacuum breaker as shown in FIG. 8 were not used, another type of vacuum breaker (50) could be used. For example, in sprinkler systems, often a type of backflow preventer known as a pressure vacuum breaker or reduced pressure device is used with the valve (20) and may be substituted for the check valve and vacuum breaker.

Also, as is known to those in the art, to meet stringent codes, a specialized hose bibb backflow preventer (53) can be used in place of the vacuum breaker (50) and the more general backflow preventer (51), shown as a check valve. The hose bibb backflow preventer (53) is also shown in FIG. 8, attached to first outlet (36). The hose bibb backflow preventer (53) could include a transitional thread that would support a hose bibb thread (62) as shown in FIG. 8.

An air port (48) is included in the valve (20), shown in FIGS. 1 and 4. The air port (48) is arranged to allow air into the valve (20) when the purge port (45) is opened. By allowing air in the valve (20), more retained fluid may be purged by avoiding a vacuum condition. The air port can be operated concurrently with the purge port (45) or with the valve stem (33) when it is rotated.

FIG. 9 shows the use of the valve (20) herein described in conjunction with a sprinkler system. The water source line (63) enters the valve (20). Water flowing through the water service line (63) would flow out of the valve (20) and into a sprinkler distribution system (64) comprising pipes, fittings, and other elements. Attached to the sprinkler distribution system may be a plurality of sprinkler elements (65) for spraying the water. The sprinkler system could be located underground or above ground, as in some commercial establishments.

It simply is not practical to describe and claim all possible revisions to the present invention which may be accomplished in general and specifically regarding the sprinkler system. For instance, the claims are directed to both methods and apparatus for the valve in various detail, but only initial claims are directed toward the sprinkler system. Naturally, the disclosure of the system or method context is sufficient to support the full scope of method and apparatus claims with the sprinkler system as well. While these may be added to explicitly include such details, the existing claims should be construed to encompass such aspects. Without limitation, the present disclosure for the sprinkler system should be construed to encompass subclaims similar to those presented in an apparatus or method context for the valve.

The invention also describes and claims a method of making the valve. If an assembly comprising the lower valve element (23), upper valve element (25), lower valve seat (30), upper valve seat (31), first pivot point (24), and second pivot point (26) are collectively called a "valve body", then the valve could be made by making a valve body, inserting a rotatable sealing element (32) in the valve body that is substantially parallel to the pivot axis (28) defined above. An axial valve stem (33) could be connected to the rotatable sealing element (32). A conduit (21) encasing the valve body and valve stem could be cut of sufficient length to attach the valve body and the valve stem to the conduit so that the pivot axis is substantially parallel to the central axis (22) of the conduit (21). Also, the valve body may be fixedly positioned longitudinally as described above in the conduit (21). An outlet could be connected to the conduit (21) and a valve stem sealing element (35) assembled to surround the valve stem (33). Other features of the valve could be included such as a purge port, an air port, and a backflow preventing element. Also, the valve body can be located a distance in the conduit from adverse ambient conditions, such as freezing temperatures to prevent freezing of the valve body. Furthermore, the valve body could be sealably attached about its periphery to the conduit (21).

FIG. 10 shows a frontal cross-sectional view of one embodiment of the purge port, as discussed earlier. Attached to axial valve stem (33) is a rotatable eccentric (47) which could be used to actuate the purge port (45). In a more general sense, any type of valve actuator can responsively engage a valve sealing element. The valve actuator could typically be a valve stem, but could include other embodiments such as a solenoid. As shown for this embodiment, part of the purge port (45) includes a unidirectional flow element (67). The unidirectional flow element (67) may engage a purge port seating surface (66) that typically could block the flow whenever the valve (20) is in use, i.e., the rotatable sealing element (32), or any valve sealing element, is at least partially open. Upon closing the rotatable sealing element (32), the rotatable eccentric (47) may engage the unidirectional flow element (67), depress it, and allow flow to be purged through the purge port (45). The unidirectional flow element (67) may be operated without a bias element (74). In some instances, it may be preferable to have a bias element (74) that maintains the unidirectional flow element (67) in a position against the purge port seating surface (66). The purge port actuation element (46) shown in FIG. 1, and the specific embodiment of a rotatable eccentric (47) shown in FIG. 10, can be actuated concurrently with the rotation of the axial valve stem (33). The purge port actuation element can be attached to the valve actuator or otherwise responsive to the rotation of the valve actuator. Furthermore, actuating a unidirectional flow element with a purge port actuation element can occur concurrently with the rotation of the valve actuator. Alternatively, it can have some delayed response, as is appropriate. Other embodiments of a unidirectional flow element could include a diaphragm unit with flaps allowing flow in one direction and not the reverse direction, as those in the art could recognize.

The bias element (74) generally may serve as a element to bias the unidirectional flow element. In some embodiments, the bias element may bias the unidirectional flow element in a normally open position against the purge port. In a normally open position, retained fluid would flow through the purge port. When the purge port actuation element engages the unidirectional flow element, flow would be restricted or closed through the purge port. This would typically occur when the valve was in use. Alternatively, the bias element could bias the unidirectional flow element in a normally closed position. Thus, the purge port actuation element would have to engage the unidirectional flow element to open the flow through the purge port. Similarly, if no bias element was used, the purge port actuation element could open and close the unidirectional flow element. This could be accomplished, for example, through a rocker apparatus, so that the purge port actuation element could close the unidirectional flow element and thereby close flow through the purge port when the valve was open.

Figure 11:
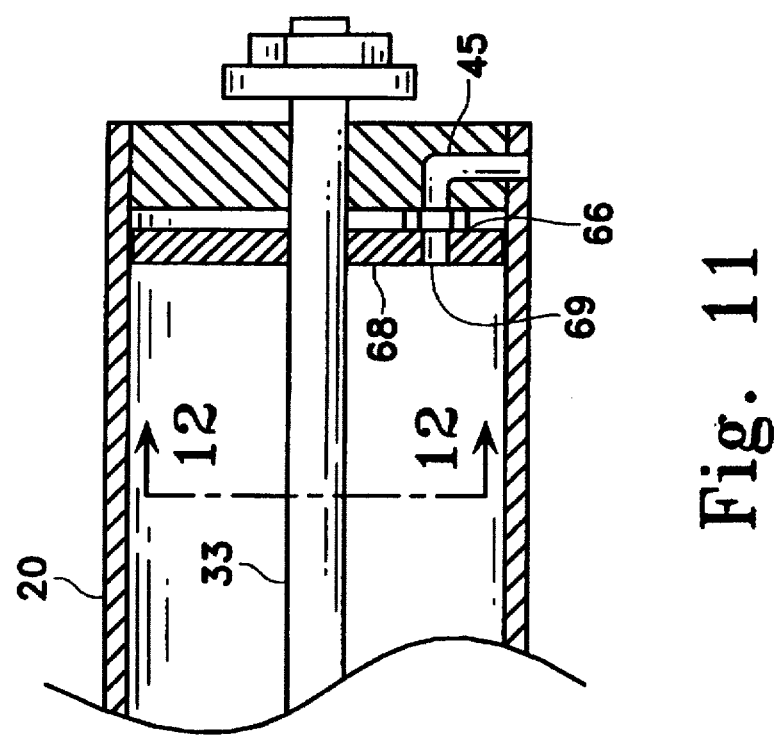
FIG. 11 shows a cross-sectional view from a side perspective of another embodiment of a purge port.

FIG. 11 shows another embodiment of the purge port (45). Purge port (45) includes a purge port seating surface (66). A rotatable purge port alignment element (68) may be attached to the axial valve stem (33). If it is attached, then as the axial valve stem (33) rotates, the rotatable purge port alignment element (68) could also rotate so that an opening (69) would become aligned with the purge port (45). This alignment could allow retained fluid in the valve (20) to drain through the purge port (45). The valve actuator can concurrently actuate the purge port actuation element and the valve sealing element.

Figure 12:
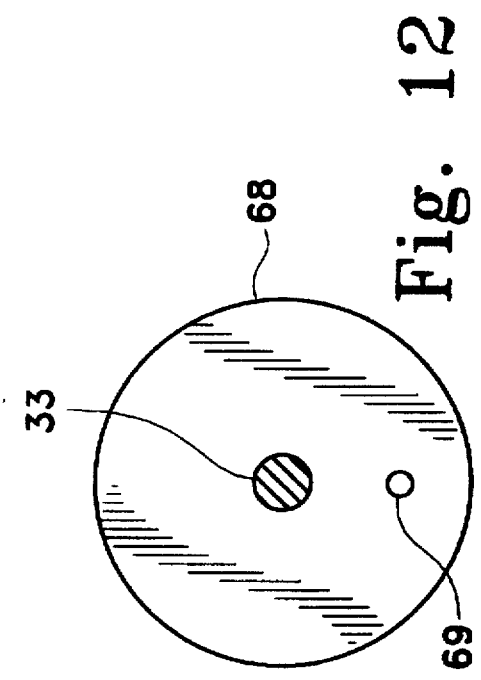
FIG. 12 shows an end view of section 12 of FIG. 11 showing the rotatable purge port alignment element.

FIG. 12 shows a front view of the rotatable purge port alignment element (68), shown in FIG. 11, wherein the purge port alignment element may be a planar element, such as a disk or other appropriate shape. The rotatable purge port alignment element (68) may be responsive to the rotation of the axial valve stem (33) so that the opening (69) moves with the rotation of the axial valve stem (33) and becomes aligned with the purge port (45), shown in FIG. 11.

Figure 13:
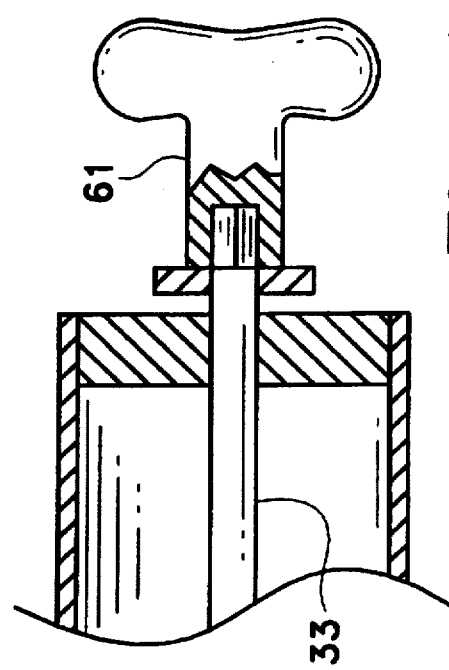
FIG. 13 shows a configuration of a tamper resistant element with a removable key.
Figure 14:
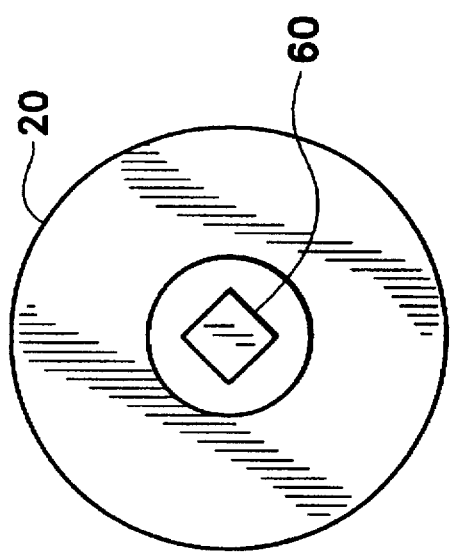
FIG. 14 shows an end view of a tamper resistant element without the removable key.

FIGS. 13 and 14 show an end view of the valve (20) which has a tamper resistant element which may be connected to or integral with the axial valve stem (33). A tamper resistant element is any element that is intended to discourage unauthorized persons from moving, rotating the valve stem (33), or otherwise affecting the performance of the valve (20). This could include children accidentally affecting the valve as well as other persons maliciously damaging the valve. In one embodiment, this tamper resistant element could include a square end integral with or connected to the valve stem (33) with a removable key (61).

Figure 15:
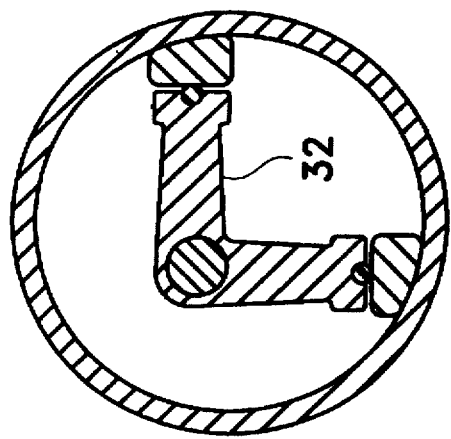
FIG. 15 shows an alternative embodiment of the rotatable sealing element in a non-planar configuration.

The rotatable sealing element (32) has been described and shown as planer. However, other configurations are possible. The key point is the rotatable sealing element (32) pivots in a substantially parallel manner at a substantially fixed position longitudinally. By way of example, the rotatable sealing element (32) could have an angular design as shown in FIG. 15. The lower valve element (32) and upper valve element (25) could be adjusted accordingly.

Figure 16:
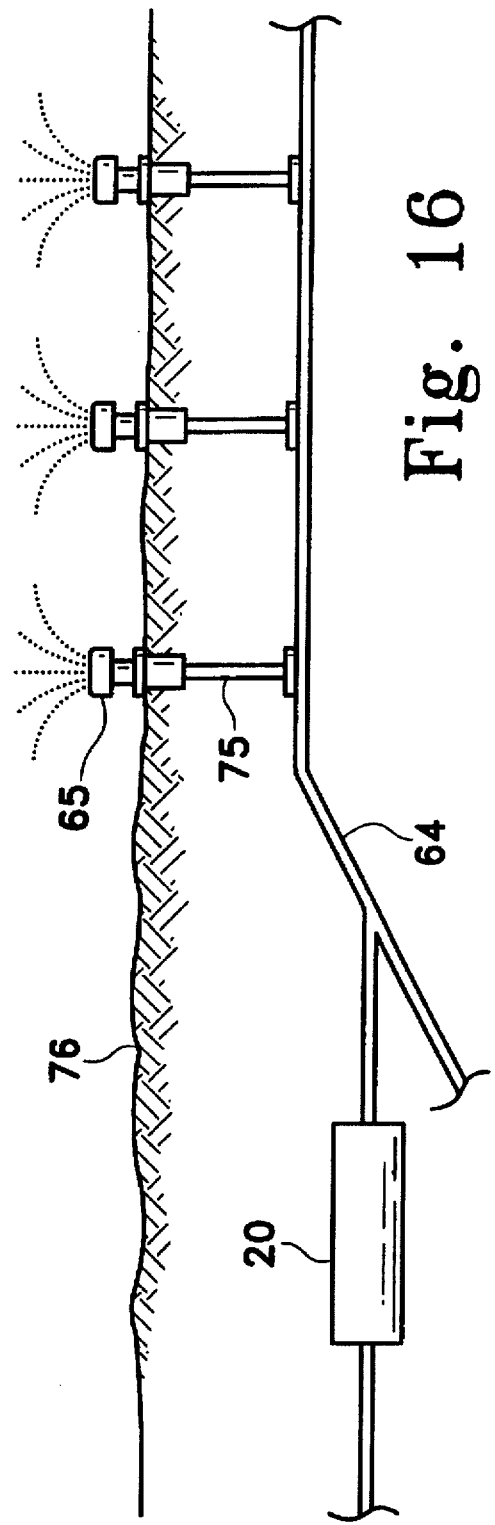
FIG. 16 shows an alternative arrangement of the valve of the present invention in an underground sprinkler system connected to a piping riser.

In combination with a hydrant or sprinkler system, the invention could be used for localized control at various locations in the sprinkler system or other systems. An example is shown in FIG. 16. The valve (20) as herein described can be attached at some point in a sprinkler distribution system (64). Attached to sprinkler distribution system (64) is a plurality of risers (75). A sprinkler element (65) could be attached to a riser (75). If freezing conditions are an issue, the valve (20) could be connected to the sprinkler distribution system (64) at a location below the ground surface (76) such that it would not freeze. When the valve (20) is closed, the afore-described purge port (45) could be actuated and therefore drain retained fluid, such as remaining water, in the sprinkler elements (65). Thus, freezing would either be prevented or reduced.

The methods claimed in this invention are natural outgrowths of the apparatus claims. Therefore, no separate discussions of the methods are deemed necessary as they claim steps that are implicit in the use and manufacture of the apparatus claims. Furthermore, the steps are organized in a logical fashion, however, other sequences can and do occur. Therefore, the method claims should not be construed to include only the order of the sequence of steps presented.

The foregoing discussion and the claims that follow describe only the preferred embodiments of the present invention. Particularly with respect to the claims, it should be understood that a number of changes may be made without departing from its essence. In this regard, it is intended that such changes—to the extent that they substantially achieve the same results in substantially the same way—would still fall within the scope of the present invention. It simply is not practical to describe and claim all possible revisions and claims to the present invention which may be accomplished. To the extent such revisions utilize the essence of the present invention, each would naturally fall within the breath of protection by any patent granted. This is particularly true for the present invention since most of the basic concepts are fundamental in nature and it can be properly applied.

I claim:

1. A valve comprising:
   a. a conduit having a central axis;
   b. a lower valve element having a first pivot point;
   c. an upper valve element having a second pivot point wherein a line between said first and second pivot points defines a pivot axis which is substantially parallel to said central axis and wherein said upper and lower valve elements are fixedly positioned longitudinally with respect to said conduit and wherein said upper and lower valve elements are sealably attached about their periphery to said conduit;
   d. a lower valve seat connected to said lower valve element;
   e. an upper valve seat connected to said upper valve element;
   f. a rotatable sealing element which axially pivots along said pivot axis and rotatably engages said lower and upper valve seats and wherein said rotatable sealing element is fixedly positioned longitudinally with respect to said conduit;
   g. an axial valve stem having a stem axis which is aligned substantially parallel to said central axis and engages said rotatable sealing element;
   h. a valve stem sealing element surrounding said valve stem; and
   i. a first outlet connected to said conduit.

2. A valve as described in claim 1 wherein said lower and upper valve elements are vertically displaced.

3. A valve as described in claim 2 wherein said lower and upper valve elements are longitudinally displaced.

4. A valve as described in claim 1 wherein said lower and upper valve elements are longitudinally displaced.

5. A valve as described in claim 1, 2, 3, or 4 wherein said lower and upper valve elements are integral.

6. A valve comprising:
   a. a conduit having a central axis;
   b. a lower valve element having a first pivot point;
   c. an upper valve element having a second pivot point wherein a line between said first and second pivot points defines a pivot axis which is substantially parallel to said central axis;
   d. a lower valve seat connected to said lower valve element;
   e. an upper valve seat connected to said upper valve element;
   f. a rotatable sealing element which axially pivots along said pivot axis and rotatably engages said lower and upper valve seats;
   g. an axial valve stem having a stem axis which is aligned substantially parallel to said central axis and engages said rotatable sealing element;
   h. a valve stem sealing element surrounding said valve stem; and
   i. a first outlet connected to said conduit
wherein said upper and lower valve elements are fixedly positioned longitudinally with respect to said conduit.

7. A valve as described in claim 6 wherein said lower and upper valve elements are longitudinally displaced from each other.

8. A valve as described in claim 6 or 7 wherein said lower and upper valve elements are integral components.

9. A valve as described in claim 6 wherein said lower and upper valve seats comprises the inner surfaces of said conduit and wherein said rotatable sealing element engages said inner surfaces of said conduit.

10. A valve as described in claim 1, 6, or 9 wherein said rotatable sealing element is non-circular.

11. A valve as described in claim 10 wherein said rotatable sealing element is a geometric element comprising at least two substantially parallel line elements.

12. A valve as described in claim 6 wherein said rotatable sealing element further comprises a flexible sealing element connected to said rotatable sealing element.

13. A valve as described in claim 1 or 6 wherein said rotatable sealing element is substantially circular.

14. A valve as described in claim 1 or 6 further comprising a purge port fluidicly connected to said conduit and a purge port actuation element attached to said valve stem to actuate said purge port wherein said purge port actuation element is actuated concurrently with the closing of said rotatable sealing element.

15. A valve as described in claim 6 wherein said valve further comprises a second outlet and wherein said second outlet is attached to a vacuum breaker.

16. A valve as described in claim 6 wherein said upper and lower valve elements are sealably attached about their periphery to said conduit.

17. A valve comprising:
   a. a conduit having an inlet, an first outlet, and a central axis;
   b. an axially-mounted extended rotatable valve stem mounted within said conduit and mounted substantially parallel to said central axis of said conduit;
   c. a valve stem sealing element surrounding said valve stem; and
   d. an axially mounted butterfly valve assembly fixedly mounted within said conduit and connected to one end of said extended rotatable valve stem.

18. A valve as described in claim 1, 6, or 17 and further comprising a purge port fluidicly connected to said conduit.

19. A valve as described in claim 18 and further comprising a purge port actuation element attached to said valve stem to actuate said purge port.

20. A valve as described in claim 19 wherein said purge port actuation element comprises a rotatable eccentric.

21. A valve as described in claim 19 and further comprising an air port interactively engaged by said purge port actuation element to allow air into said conduit upon actuating said purge port.

22. A valve as described in claim 1, 6, or 17 wherein said axial valve stem has a length wherein said length is a distance required to extend said axial rotatable sealing element away from freezing ambient conditions to prevent freezing.

23. A valve as described in claim 17 and further comprising a purge port fluidicly connected to said conduit and a purge port actuation element attached to said valve stem to actuate said purge port wherein said purge port actuation element is actuated concurrently with the closing of said axially mounted butterfly valve assembly.

24. A valve as described in claim 17 wherein said axially mounted butterfly valve assembly is sealably attached about its periphery to said conduit.

25. A winterizing sprinkler system comprising:
a. a water source line;
b. a sprinkler distribution system connected to said water source line;
c. a plurality of sprinkler elements connected to said sprinkler distribution system;
d. a conduit located between said water source line and said sprinkler distribution system, having a central axis and a first outlet;
e. a lower valve element having a first pivot point;
f. an upper valve element having a second pivot point wherein a line between said first and second pivot points defines a pivot axis which is substantially parallel to said central axis of said conduit and wherein said upper and lower valve elements are fixedly positioned longitudinally with respect to said conduit;
g. a lower valve seat connected to said lower valve element;
h. an upper valve seat connected to said upper valve element;
i. a rotatable sealing element which axially pivots along said pivot axis and rotatably engages said lower and upper valve seats;
j. an axial valve stem having a stem axis which is aligned substantially parallel to said central axis and engages said rotatable sealing element and wherein said axial valve stem has a length wherein said length is a distance required to extend said axial rotatable sealing element away from freezing ambient conditions to prevent freeze; and
k. a valve stem sealing element surrounding said valve stem.

26. A valve as described in claim 25 wherein said lower and upper valve elements are integral components.

27. A valve as described in claim 1, 6, 17, or 25 and further comprising a backflow preventer connected to said conduit.

28. A valve as described in claim 1, 6, 17, or 25 and further comprising at least two positive valve stem stops wherein said stops positively stop said valve stem at predetermined rotated positions.

29. A valve as described in claim 1, 6, 17, or 25 and further comprising a tamper proof element located near said valve stem sealing element.

30. A method of providing improved flow rates from a valve comprising the steps of:
a. making a valve body having an axial seat and a first pivot point and a second pivot point wherein a line between said first and second pivot points defines a pivot axis and wherein said first and second pivot points are separated by a rotatable sealing element and further comprising a flow path crossing said pivot axis at a section between said first and second pivot points and through said rotatable sealing element;
b. inserting said rotatable sealing element in said valve body substantially parallel to said pivot axis;
c. connecting a valve stem to said rotatable sealing element;
d. cutting a conduit of sufficient length to attach said valve body to the inside of said conduit and wherein said conduit has a central axis;
e. attaching said valve body to said conduit so that said pivot axis of said valve body is substantially parallel to said central axis of said conduit and said valve body is fixedly positioned longitudinally in said conduit;
f. connecting an outlet to said conduit; and
g. surrounding said valve stem with a valve stem sealing element.

31. A valve as described in claim 30 and further comprising the step of forming a purge port in said valve for purging said conduit and further comprising the step of attaching a purge port actuation element to said valve stem for engaging said purge port.

32. A valve as described in claim 31 wherein said step of attaching said purge port actuation element to said valve stem further comprises the step of eccentrically attaching a cam to said valve stem for rotatably actuating said purge port.

33. A valve as described in claim 31 and further comprising the step of forming an air port in said conduit for allowing air into said conduit when said purge port is actuated.

34. A valve as described in claim 30 or 31 and further comprising the step of securing a backflow preventing element to said conduit.

35. A valve as described in claim 30 and further comprising the step of restricting the rotation of said rotatable sealing element to predetermined rotated positions.

36. A valve as described in claim 30 and further comprising the step of locating said valve body a distance away from freezing ambient conditions for preventing freezing of said valve body.

37. A valve as described in claim 30 wherein said step of attaching said valve body to said conduit further comprises the step of sealably attaching the periphery of said valve body to said conduit.

* * * * *